Figure 1:
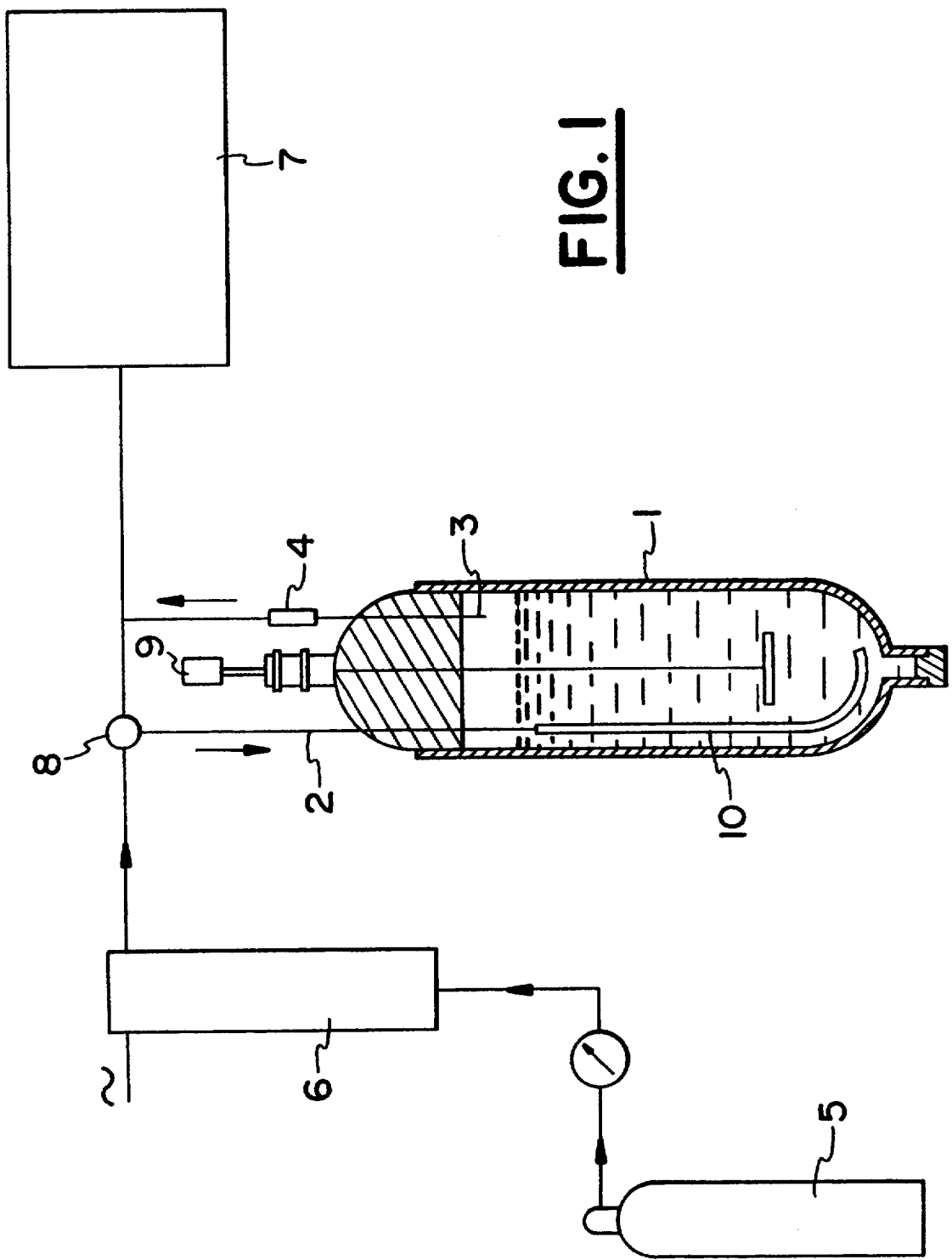

United States Patent [19]

Borredon et al.

[11] Patent Number: 5,373,067
[45] Date of Patent: Dec. 13, 1994

[54] PROCESS FOR THE TREATMENT OF POLYMERS BASED ON CROSS-LINKED E.V.A. AND APPLICATIONS

[75] Inventors: Elisabeth Borredon, Tournefeuille; Michel Delmas, Auzeville Tolosane; Antoine Gaset; Akbar Fahimi, both of Toulouse; Mohamed Abdennadher, Ramonville Saint Agne; Gilbert Raynaud, Muret; Marc Jakubowski, Gagnac/Garonne, all of France

[73] Assignee: Enterprise "Malet", Toulouse Cedex, France

[21] Appl. No.: 955,753

[22] PCT Filed: Jun. 20, 1991

[86] PCT No.: PCT/FR91/00499

§ 371 Date: Feb. 25, 1993

§ 102(e) Date: Feb. 25, 1993

[87] PCT Pub. No.: WO92/00334

PCT Pub. Date: Jan. 9, 1992

[30] Foreign Application Priority Data

Jun. 26, 1990 [FR] France ................... 90 08425

[51] Int. Cl.$^5$ ................................ C08F 8/06
[52] U.S. Cl. .................... 525/388; 521/40.5; 525/330.3
[58] Field of Search .............. 525/388; 521/40.5

[56] References Cited

U.S. PATENT DOCUMENTS 4,118,427 10/1978 Rhein et al. .
4,378,998 4/1983 Korbanka et al. ............... 525/388

FOREIGN PATENT DOCUMENTS 0028384 5/1981 European Pat. Off. .
2292715 6/1976 France .

*Primary Examiner*—Bernard Lipman
*Attorney, Agent, or Firm*—Shlesinger, Arkwright & Garvey

[57] ABSTRACT

The invention concerns a process for the treatment of cross-linked polymeric materials based on E.V.A. (ethylene vinyl acetate) with a view to obtaining polymeric fragments having a lower molecular mass.

The process consists of incorporating the polymeric materials, after reduction to a particulate form, in a solvent, notably aromatic and/or halogenated, suitable for diffusing into the interior of the polymeric network and for swelling the latter, and subjecting the reaction medium to a stream of ozone.

This process ensures a controlled cleavage of the cross-linked molecules without total destruction of the polymer or disruption of the functional groups. The products obtained may notably be used as modifying agents for hydrocarbon binders or aggregates treated with a hydraulic binder or again as coating binders for granulates.

11 Claims, 2 Drawing Sheets

PROCESS FOR THE TREATMENT OF POLYMERS BASED ON CROSS-LINKED E.V.A. AND APPLICATIONS

The invention concerns a process for the treatment of polymeric materials based on cross-linked E.V.A (vulcanized ethylene vinyl acetate) in order to obtain polymeric fragments with a lower molecular mass. The process of the invention applies in particular to the treatment of waste based on E.V.A (waste from the boot and shoe industry etc) with the object of using it profitably, notably as a modifying agent, a coating binder or as a raw material.

Polymers based on cross-linked E.V.A are very specific compounds by virtue of their three-dimensional non-linear structure and strong covalent bonds which ensure cohesion in the three-dimensional network. These compounds are insoluble in an aqueous medium and in all organic solvents.

At the present time, in many industries, notably the boot and shoe industry, considerable quantities of waste are produced based on the cross-linked compounds referred to above and no process exists which enables them to be de-crosslinked in order to :render them soluble for the purpose of recycling. Consequently, taking into account the nuisance problems associated with these compounds (they are very difficult to degrade) they are currently destroyed essentially by pyrolysis or combustion.

The difficulty of de-crosslinking these compounds results from the existence of strong covalent bonds in the three-dimensional network; these bonds are difficult to break without totally destroying the molecule with the production of a diversity of small unusable molecules.

In another connection, ozone has already been used for converting certain pure polymers, for example polyethylene or polyolefines, by oxidizing them. Such ozonization processes are described in the following publications: French patent 1,472,411; B.BOUTEVIN et al., Ozonization of polyethylene. Eur. Polym. J. Vol 20 n°9 pp 875-878, 1984; U.S. Pat. No. 4,118,427; French patent 2,292.715. However such processes are aimed at pure non cross-linked polymers which are by nature very different from those aimed at by the invention and which are in particular soluble (certain processes work in an aqueous medium) and have as their objective the oxidation of these polymers with a view to utilizing them at a later stage. These previous documents do not provide any information concerning the de-cross linking of polymers based on vulcanized E.V.A. For example, U.S. Pat. No. 4,118,427 describes total depolymerization of a soluble polymer whose molecular mass is 80,000, leading to the production of small molecules with a molecular mass of the order of 1,000 to 2,000 which no longer have the physico-chemical properties of the starting polymer.

The present invention proposes to provide a process for the treatment of polymeric materials based on cross-linked E.V.A. with a view to converting this material into polymeric fragments having a lower molecular mass; the invention thus aims at producing soluble and hence usable fragments of the starting cross-linked polymers.

An essential objective of the invention is to carry out this conversion without totally destroying the polymer, that is to say by limiting it to a controlled cleavage of the molecule by breaking certain bonds without disrupting the functional groups.

For this purpose, the process according to the invention for treating polymeric materials based on cross-linked E.V.A., consists of:

reducing the polymeric materials into a particulate form, incorporating the polymeric particles obtained into an organic solvent suitable for diffusing into the interior of the polymeric network of the material and for swelling the said network, the said solvent being chosen as being by nature non-degradable or only slightly degradable by ozone, subjecting the reaction medium consisting of the solvent containing the particles, to a stream of ozone until the desired size of the polymeric fragments is obtained, separating the solid phase from the solvent.

Experiments have shown that unexpectedly, the process of the invention which operates in the liquid phase enables certain covalent bonds of the cross-linked E.V.A. to be broken without modifying the functional vinyl acetate groups. First of all, the solvent acts as a swelling agent on the cross-linked material (which is insoluble by virtue of its cross-linking); this agent is drawn into the three dimensional network of the polymer which, in swelling, becomes accessible to the action of ozone in the dissolved state. The solvent then acts as an ozone carrier and it has been noted that the ozonization reaction in the liquid phase is not exothermic, which shows that certain non-functional bonds are broken without the functional groups being affected. At the end of the treatment, polymeric fragments are obtained which are soluble in conventional organic solvents: THF, toluene, benzene, chlorobenzene, etc.

The solvent used in the process of the invention is in particular an aromatic and/or halogenated solvent of the following group: chlorobutane, 1,1,1-trichloroethane, dichloromethane, carbon tetrachloride and chlorobenzene. The polymeric particles are advantageously incorporated in this solvent within a range of concentrations lying between 10 g/l and 80 g/l. Above 80 g/l, the saturation ceiling of the cross-linked polymer is reached: the viscosity of the medium being high, ozone diffusion becomes slow, difficult to ensure and non-homogeneous. Below 10 g/l, it is noted that destruction of the polymer commences.

In addition, according to a preferred operational method which facilitates the recovery of polymer fragments, an aliphatic alcohol is added to the reaction medium after ozonization in order to facilitate extraction of the solid phase, and separation of the said solid phase is then carried out by filtration; the solvent is then separated from the alcohol by evaporation in order to recycle it. The addition of aliphatic alcohol encourages the precipitation of polymeric fragments which are thus much more easily separated from the reaction medium.

Preferably, the starting polymeric materials are previously reduced into the form of particles having a mean particle size of between 100 and 800 micrometres. This size appears to correspond to the best ozone reactivity with the polymer network.

Impregnation with solvent may be carried out prior to the passage of ozone or simultaneously. The process is carried out at a temperature of between 20° C. and 50° C.: in the first case, a low temperature may be chosen within this range; in the second case, a higher temperature is preferable (40° C. to 50° C.) in order to accelerate swelling and to provide a homogeneous attack by ozone as soon as the reaction starts. In addition, the temperature at which impregnation takes place lies advantageously between 30° C. and the reflux temperature.

The time for impregnation by the solvent is a function of the polymer concentration in the said solvent and lies preferably between 10 and 30 minutes for the range of concentrations quoted previously, the medium being continually stirred. The swelling obtained corresponds, under these conditions, to an increase in volume of the reaction medium of at least twice the initial volume.

The ozone may be bubbled through the reaction medium whilst the said medium is stirred, the said bubbling being carried out at a flow rate of between 30 and 100 mg of ozone per litre of medium for a period of between 45 and 300 minutes. These ranges covering flow rate and duration constitute a good compromise, enabling effective fragmentation of the cross-linked polymer to be obtained without risking the total destruction of the molecules.

Bubbling may be carried out with a mixture of oxygen and ozone, prepared from oxygen in a conventional way in a cold plasma reactor.

Polymeric materials based on cross-linked E.V.A generally have molecular masses in excess of 300,000, these molecular masses being capable of reaching much higher values. The process of the invention, carried out under the conditions defined above, enables polymeric fragments to be obtained with a molecular mass of less than 100,000. This mass may be verified by analysing samples as the reaction proceeds and by stopping the latter when the desired molecular mass is reached. This verification of the molecular mass is in practice essential for enabling the product obtained to be adapted to the applications envisaged.

The process of the invention may in particular be carried out for the profitable use of industrial waste containing at least 40% cross-linked E.V.A by weight, this compound being possibly associated with mineral fillers or other cross-linked or uncrosslinked polymers (notably uncrosslinked E.V.A).

The invention extends to specific applications regarding which the polymeric fragments obtained show particularly interesting properties.

According to a first type of application, these fragments are used as a modifying agent for hydrocarbon binders, notably bituminous binders, into which they are incorporated hot. This incorporation enables the rheological and thermal properties of the binder to be improved (flexibility, elasticity, mechanical strength and reduced heat sensitivity).

According to another type of application, the fragments obtained as a result of the process are used as a modifying agent for aggregates treated with a hydraulic binder, with which they are incorporated cold (improvements to the flexibility of the treated aggregate containing material and cracking limitation).

The fragments may also be used as a binder for coating granulates (natural or synthetic granulates) in order to produce coated grit benefitting, where necessary, from pigmentation of the coating layer. This coating may be carried out cold, from an emulsion or hot.

The polymeric fragments resulting from the invention may also be used as a raw material for the production of shoe soles, these fragments being mixed with other types of polymer (for example styrene butadiene rubber (SBR) etc).

In most of the applications, the fragments are ground before incorporation in order to reduce their particle size to between 300 and 1000 micrometres. Incorporation may be carried out directly with particles in powder form, or indeed after dissolving or emulsifying the said powder.

Figure 2:
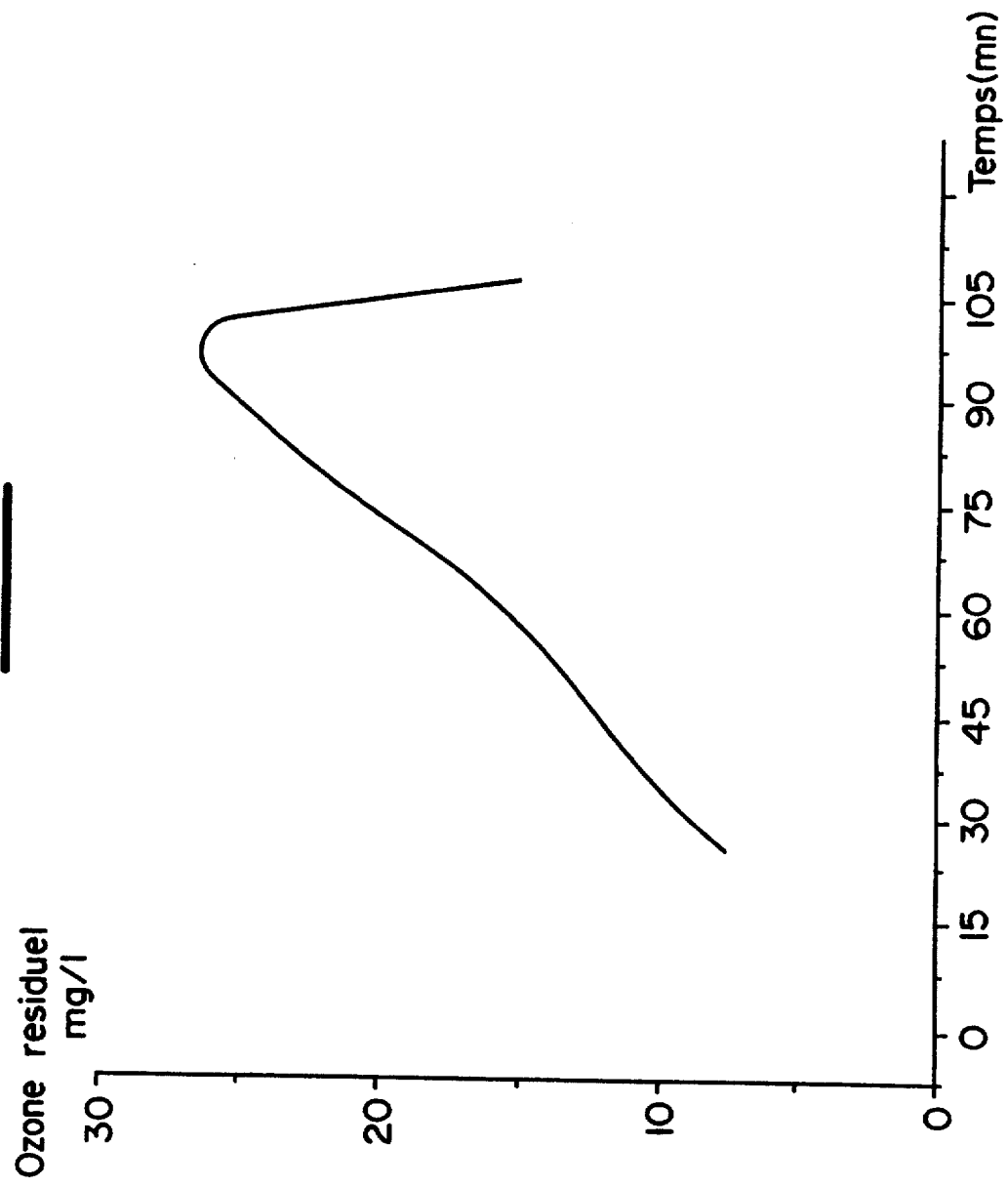

The following examples illustrate the process of the invention and applications for the polymeric fragments obtained. The annexed drawings show:

FIG. 1: a diagram of an installation for putting the said process into operation, FIG. 2: a curve obtained in example 1 giving the quantity of residual ozone as a function of ozonization time.

The process is carried out in a closed reactor 1, provided with an inlet 2 for oxygen loaded with ozone, with distribution being made in the form of fine bubbles by means of a diffuser 10, and an outlet 3 for residual gas, provided with a condenser 4. The oxygen source consists of a cylinder 5 and ozone is produced by means of a conventional type ozone generator 6 (cold plasma reactor).

The outlet 3 is connected to a conventional ozone analyser 7 (potassium iodide solution analyser). A bypass provided with a valve 8 enables the incoming gas to be diverted to the analyser 7 before the treatment so as to analyse its composition.

The reactor 1 contains the chosen solvent, in which the polymeric materials to be treated are incorporated. The medium is continually stirred by means of a stirrer 9. The reactor is provided with outlets for sampling and emptying.

EXAMPLE 1

In this example, the material, based on cross-linked E.V.A., came from unusable offcuts from shoe soles (wrong shape).

A mixture was used containing 50 to 60% of E.V.A. (70 to 80% ethylene, 30–20% vinyl acetate), 10 to 12% of SBR (styrene butadiene rubber) or EPDM (ethylene propylene diene monomer), a few % of polyethylene glycol (PEG) and oils, 3–5% vulcanizing agent: 1,3-ditert-butyl peroxy isopropyl benzene ("Peroximon F40"), activators and accelerators. Elementary analysis provided the following results:

65.7% carbon
10.2% hydrogen
7.4% oxygen

The product was ground to have a particle size of 500 micrometres.

This cross-linked (also referred as vulcanized) product had a three dimensional network with a very high molecular mass: one fraction had a molecular mass of the order of 300,000 and the other fraction had a very much higher molecular mass. This product was very sparingly soluble in conventional organic solvents.

30 g of this product were placed in reactor 1 with a litre of carbon tetrachloride. The medium was refluxed (at 76° C.) for 15 minutes and was then allowed to cool to a temperature of 23° C., before starting the gas flow. The carrier gas flow (oxygen) leaving the cylinder 5 was adjusted to 0.4 litre per minute. The input voltage for the ozone generator 6 was adjusted so that ozone was delivered at a flow rate of 50 mg per litre.

The ozone consumption was followed with time by measuring the concentration of ozone at the outlet from the reactor 1; FIG. 2 gives the concentration of residual ozone in the gas as a function of time.

A high ozone consumption was observed at the start of the reaction, associated with saturation of the solvent with ozone and with the reactivity of ethylenic double bonds present in the polymeric material. A reduction in ozone consumption was then noted reaching a minimum at which the ozone consumption in the reactor is at its lowest, this minimum corresponding to a maximum M of residual ozone.

The ozone consumption then increased once again. The maximum solubility of the material was reached in this zone, which corresponded to a solubilization time of 2 hours.

The ozonization reactor 1 was then emptied into a vessel containing 1 litre of aliphatic alcohol (ethanol, propanol, isopropanol), in this example ethanol; the E.V.A based material precipitated. It was recovered by filtration.

Its structural analysis was carried out by infrared spectroscopy, proton nuclear magnetic resonance NMR and analysis for peroxides and hydroperoxides. The presence of the following functional groups was noted: carbonyls, carboxyls, peroxides and hydroperoxides and preservation of the characteristic E.V.A functional groups was also noted.

Analysis for peroxides and hydroperoxides was carried out with 5-diphenyl picrylhydrazine (DPPH) (2). The concentration of peroxide was equal to $5.10^{-4}$ mole-equivalent per gramme of polymer.

The results of elementary analysis of the material after ozonization were as follows:
61.5% carbon
9.9% hydrogen
8.4% oxygen The molecular mass of the final product was determined by gel permeation chromatography with tetrahydrofuran as eluent and a refractometer as detector. Its value was 9,000. A calibration curve was prepared from standard polystyrene on a straight TSK column kept at a constant temperature of 40° C.

EXAMPLE 2

This example was carried out under the same conditions as that of example 1, only the initial concentration of the material being varied. It will be noted that the ozonization time necessary to obtain fragments having a molecular mass of 49,000 increased with the initial concentration of the material according to the following table:

| Initial concentration of material (g/l) | 10 | 30 | 40 |
|---|---|---|---|
| Solubilization time (min) | 60 | 120 | 180 |

EXAMPLE 3

Example 3 was carried out under the same experimental conditions as Example 1 except that the ozonization temperature was varied (table below).

The solubilization time became shorter when the ozonization temperature increased, to reach the same final molecular mass (49,000).

| Ozonization temperature (°C.) | 23 | 30 | 40 | 50 |
|---|---|---|---|---|
| Solubilization time (min) | 120 | 110 | 100 | 90 |

EXAMPLE 4

Example 4 was carried out under the following conditions:
quantity of CCl$_4$: 1 litre
ozone concentration: 90 mg per litre
temperature: 40° C.

The initial concentration of material was varied (table below).

The solubilization time increased as a function of the initial concentration of the material. It was noted that above an initial concentration of material of 75 g/l, the reaction medium became very viscous, making it difficult to obtain the maximum solubility ceiling. A concentration of 75 g/l to 80 g/l is thus a value that should not be exceeded in practice.

| Initial concentration of material (g/l) | 40 | 60 | 75 |
|---|---|---|---|
| Solubilization time (min) | 165 | 270 | 330 |

EXAMPLE 5

This example was carried out under the same conditions as example 1 using a sample of pure vulcanized E.V.A. Vulcanization (or cross-linking) was carried out in the following way: 40 g of pure E.V.A (78% ethylene, 20% vinyl acetate) were dissolved in 150 ml of toluene. 2% of "Peroximon F40" was added and stirring was carried out for 30 minutes. The solvent was evaporated under reduced pressure. The polymer sheet thus obtained was placed in an oven at 170° C. for one hour in order to vulcanize the material.

The material which was vulcanized in this way was ground to have a particle size of 500 micrometres. 30 g of this sample were introduced into the reactor 1 under the same conditions as those in example 1.

At the end of an ozonization time of 75 minutes, the molecular mass of the fragments obtained (41,000) was close to that obtained from E.V.A waste.

EXAMPLE 6

The products used in this application were obtained under the conditions of Example 1, except that the ozonization time was varied between 105 and 240 minutes (table below).

Each product, in the form of a powder, was added to bitumen (180–220 grade) heated to 170° C. in an oil bath. The mixture was stirred for two hours and then stoved for 24 hours. The following results were obtained:

| Quantity of polymer in bitumen (%) | Ozonization time (min) | Softening point (°C.) (ring & ball) | Penetration (1/10 mm) |
|---|---|---|---|
| 7% | 105 | 65 | 88 |
| 7% | 120 | 62 | 87 |
| 7% | 165 | 56 | 97 |
| 7% | 240 | 51 | 107 |

(the ring and ball softening point tests and the penetration tests were carried out according to standards NFT 66008 and NFT 66004).

After 105 minutes of ozonization, a bituminous binder was obtained having similar properties to the binder obtained from pure E.V.A (softening point: 63° C.; penetration: 84).

By way of comparison, pure bitumen of the type used (grade 180-200) had the following properties: softening point: 34° to 43° C.; penetration 180 to 200.

EXAMPLE 7

In this example, the products obtained in Example 1 were used in powder form as a raw material for the manufacture of shoe soles. A mixture was prepared containing the following ingredients by weight:

20% powdered E.V.A., de-crosslinked according to the invention,

40% pure E.V.A., in powder form,

10% to 12% pure SBR, in powder form,

20% to 25% conventional fillers such as calcium carbonate and silicas.

1% to 3% vulcanizing agent (benzoyl peroxide), where required, small quantities of additives (wax, antioxidant etc).

The mechanical and rheological properties of the soles obtained were identical to those obtained only from pure E.V.A polymers.

We claim:

1. Process for the treatment of cross-linked polymeric materials based on E.V.A (ethylene vinyl acetate) in order to obtain polymeric fragments with a lower molecular mass than that of the starting cross-linked materials, characterized in that it consists of:

reducing the polymeric materials to a particulate form, incorporating the polymeric particles obtained in an organic solvent suitable for diffusing into the interior of the polymeric network of the material and for swelling the said network, the said solvent being chosen as being by nature non-degradable or only slightly degradable by ozone, subjecting the reaction medium consisting of the solvent containing the particles, to a stream of ozone until the desired size of the polymeric fragments is obtained, separating the solid phase from the solvent.

2. Treatment process according to claim 1, characterized in that an aromatic and/or halogenated solvent is used from the following group: chlorobutane, 1,1,1-trichloroethane, dichloromethane, carbon tetrachloride and chlorobenzene.

3. Treatment process according to claim 1 characterized in that, following ozonization, an aliphatic alcohol is added to the reaction medium in order to facilitate extraction of the solid phase, and separation of the said solid phase is then carried out by filtration, the solvent being then separated from the alcohol by evaporation in order to recycle it.

4. Treatment process according to claim 1 characterized in that the starting polymeric materials are reduced to the form of particles having a size of between 100 and 800 micrometres.

5. Treatment process according to claim 1 characterized in that the polymeric particles are incorporated into the solvent in a concentration range of between 10 g/l and 80 g/l.

6. Treatment process according to claim 1 characterized in that the polymeric particles are left immersed in the solvent, with stirring, for a period of between 10 and 30 minutes until an increase in the volume of the reaction medium is obtained of at least twice the initial volume.

7. Treatment process according to claim 1 characterised in that the stream of ozone is bubbled into the reaction medium with stirring of the said medium, the said bubbling being carried out at a flow rate of between 30 and 100 mg of ozone per litre of medium for a period of between 45 and 300 minutes.

8. Treatment process according to claim 7, in which bubbling is carried out by means of a mixture of oxygen and ozone, prepared from oxygen in a cold plasma reactor.

9. Treatment process according to claim 1 characterized in that the solvent impregnation temperature lies between 30° C. and the reflux temperature of the said solvent, whilst the ozonization temperature lies between 20° C. and 50° C.

10. Treatment process according to claim 1, carried out on polymeric materials of molecular mass greater than 300,000, with a view to obtaining polymeric fragments with a molecular mass of less than 100,000.

11. Treatment process according to claim 10, carried out on industrial waste containing at least 40% by weight of E.V.A., associated with mineral fillers and other polymers.

* * * * *

UNITED STATES PATENT AND TRADEMARK OFFICE
CERTIFICATE OF CORRECTION

PATENT NO. : 5,373,067
DATED : December 13, 1994
INVENTOR(S) : ELISABETH BORREDON et al.

It is certified that error appears in the above-indentified patent and that said Letters Patent is hereby corrected as shown below:

On the title page, Item [73] delete: "Enterprise" and insert therefor --Entreprise--.

Signed and Sealed this

Twenty-sixth Day of September, 1995

Attest:

BRUCE LEHMAN

Attesting Officer     Commissioner of Patents and Trademarks